United States Patent
Burke et al.

(12) 
(10) Patent No.: US 10,040,486 B1
(45) Date of Patent: Aug. 7, 2018

(54) TRAILER BOLSTER FENDER BRACKET

(71) Applicant: Aspen Custom Trailers, Richmond (CA)

(72) Inventors: Brett Burke, Leduc (CA); Stuart Humphrey, Leduc (CA)

(73) Assignee: Aspen Custom Trailers, Richmond (CA)

( * ) Notice: Subject to any disclaimer, the term of this patent is extended or adjusted under 35 U.S.C. 154(b) by 0 days.

(21) Appl. No.: 15/495,921

(22) Filed: Apr. 24, 2017

(30) Foreign Application Priority Data

Feb. 8, 2017 (CA) ..................................... 2957377

(51) Int. Cl.
*B62D 25/16* (2006.01)

(52) U.S. Cl.
CPC ......... *B62D 25/163* (2013.01); *B62D 25/168* (2013.01)

(58) Field of Classification Search
None
See application file for complete search history.

(56) References Cited

U.S. PATENT DOCUMENTS 7,832,751 B2 * 11/2010 Fischer .................... B62J 15/00
280/154

OTHER PUBLICATIONS

Hydraulic Removable Gooseneck Trailers; Dated: Jan. 19, 2018; pp. 2.
Outside Bolsters; Dated: Jan. 8, 2018; pp. 3.

* cited by examiner

*Primary Examiner* — John D Walters
*Assistant Examiner* — Hilary L Johns
(74) *Attorney, Agent, or Firm* — Lowe Graham Jones PLLC

(57) ABSTRACT

An improved removable and installable fender for the bolsters of a trailer group relies on the use of a bracket on the bolster, the bracket having two retaining arms. A single fastening means is provided on the bolster to receive a bolt securing a medial portion of the end of the fender to the bolster, allowing the distal sides of the fender to be retained between the two retaining arms of the bracket and the body of the bolster.

5 Claims, 6 Drawing Sheets

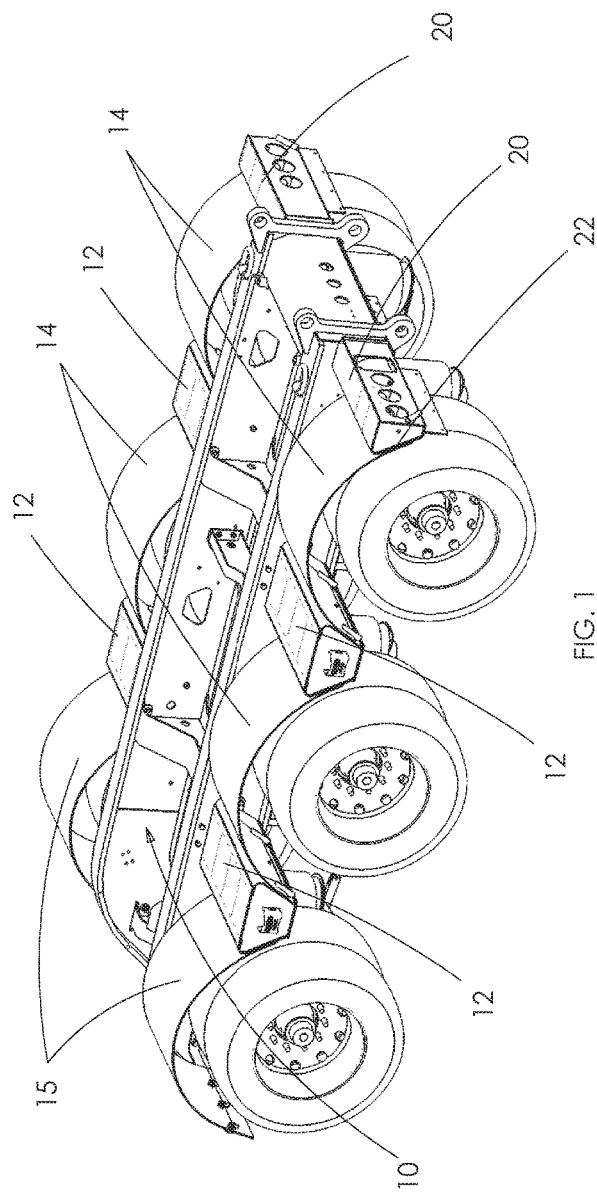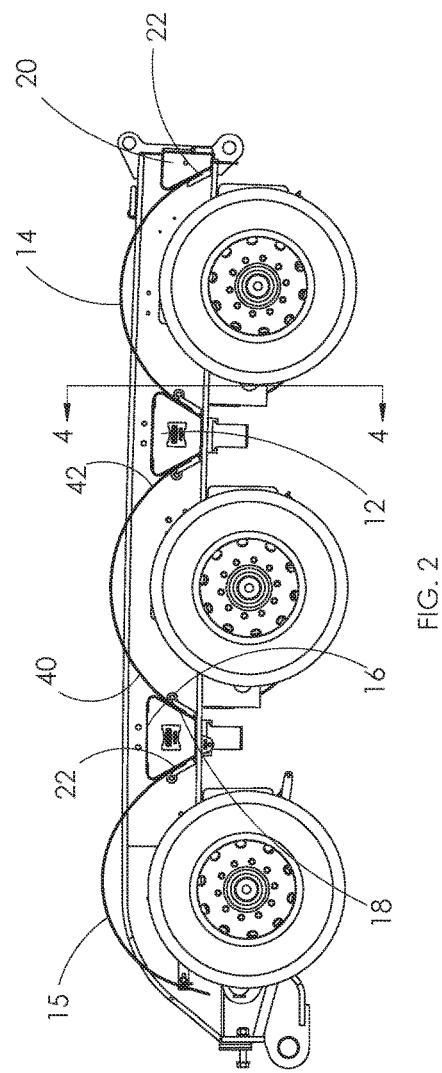

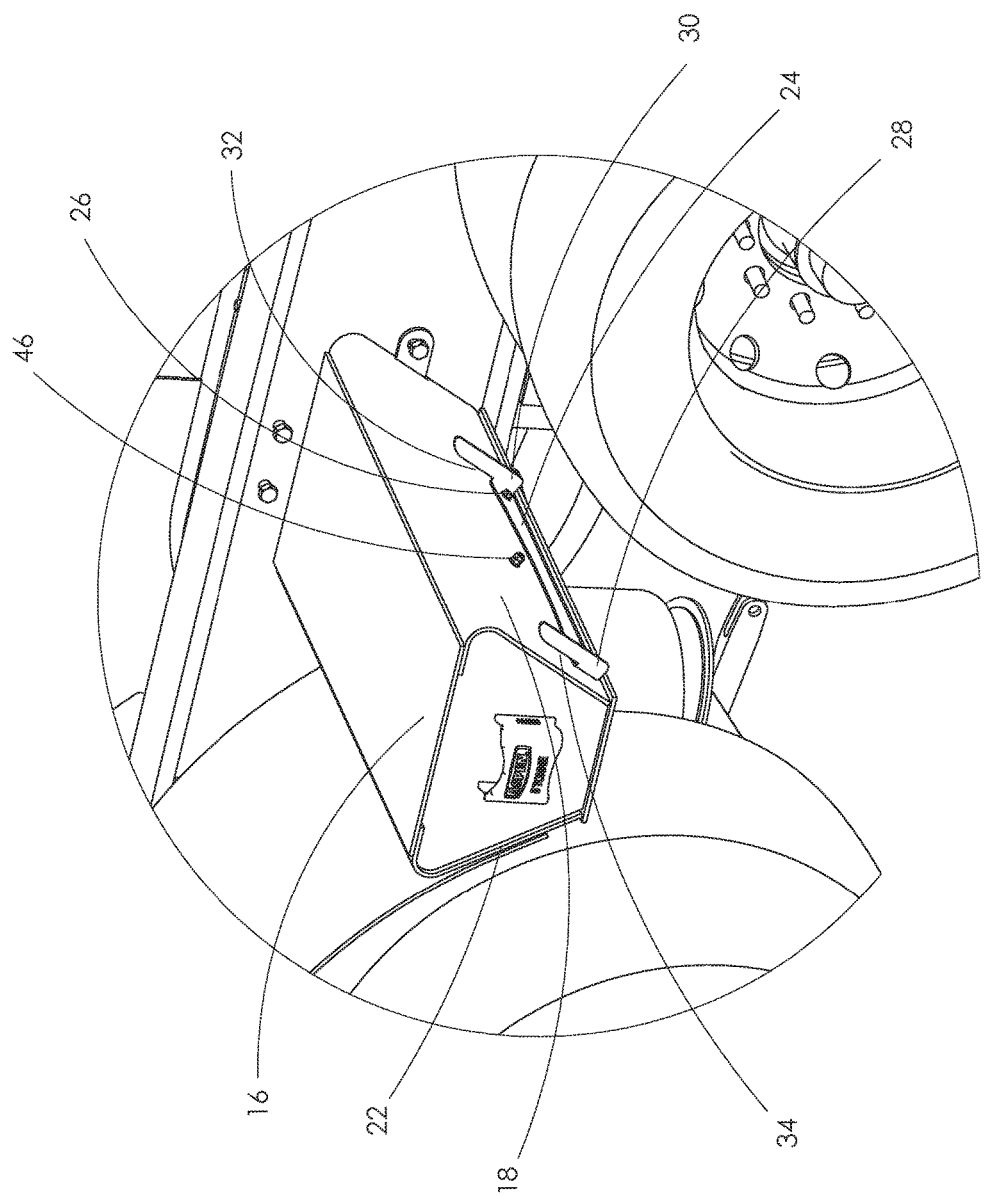

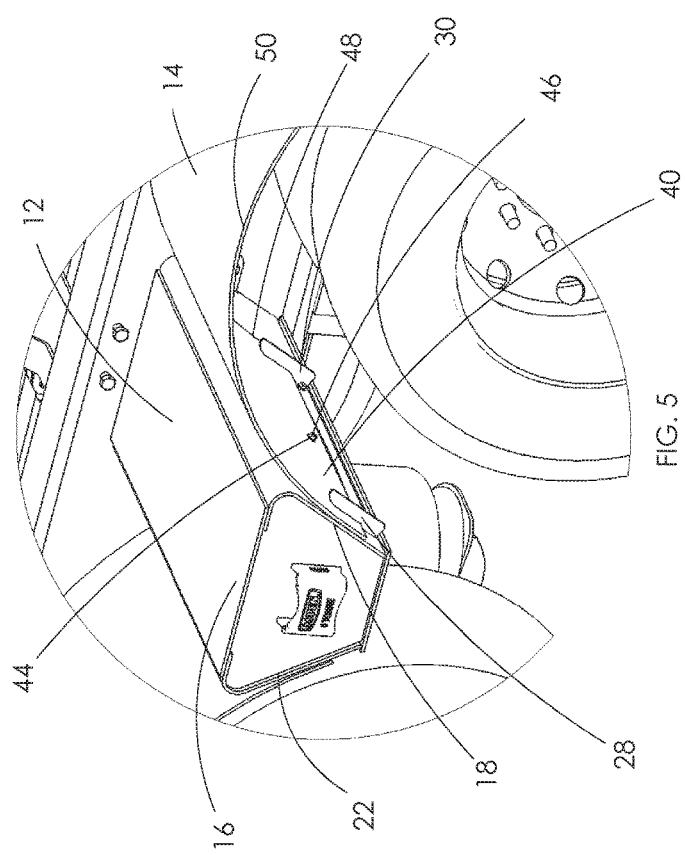
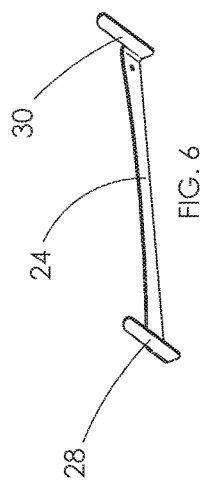

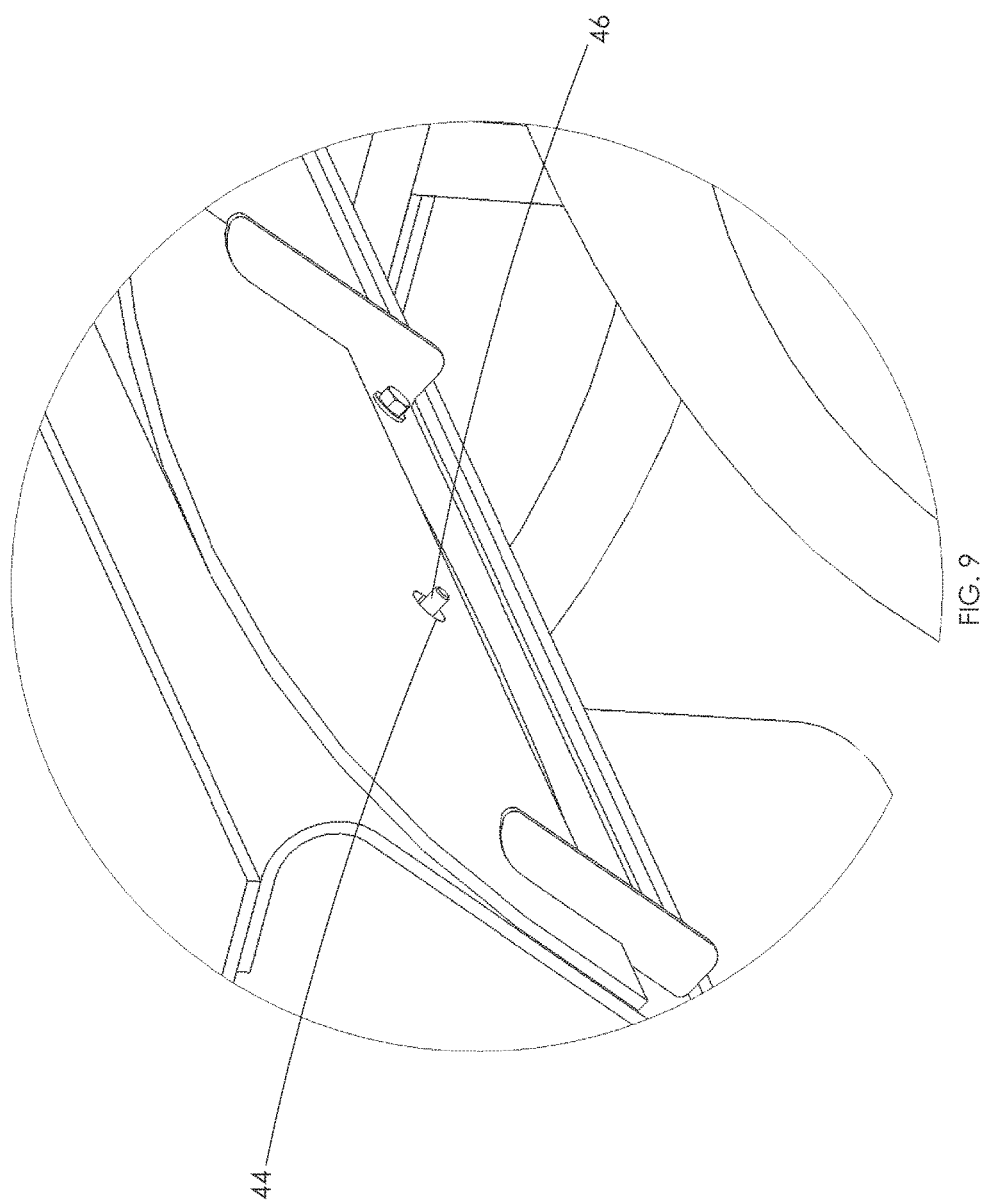

TRAILER BOLSTER FENDER BRACKET

FIELD OF THE INVENTION

This invention relates to removable fenders attached to bolsters on trailer groups.

BACKGROUND OF THE INVENTION

A bolster is a load-supporting structure sometimes provided between successive wheels of a trailer group. Some bolsters are trapezoidal in shape, providing a flat top load-supporting surface and having inwardly and downwardly inclined side walls.

It is known to provide fenders between the bolsters of a trailer group so as to obstruct any debris from the underlying wheels. However, when a load is to be mounted on the trailer group to rest on the bolsters, it is necessary to remove the fender. That is done by removing various bolt attachments points at the front and back of the fenders, usually two bolts at each end.

It is an object of the present invention to provide a more convenient means of installing and removing fenders between the bolsters of trailer groups.

This and other objects of the invention will be better understood by reference to the detailed description of the preferred embodiment which follows. Note that the object referred to above is a statement of what motivated the invention rather than a promise. Not all of the objects are necessarily met by all embodiments of the invention described below or by the invention defined by each of the claims.

SUMMARY OF THE INVENTION

The present invention is directed to a more easily removable and installable fender for the bolsters of a trailer group. The invention relies on the use of a bracket on the bolster, the bracket having two retaining arms. A single retaining means is provided on the bolster to retain a medial portion of the end of the fender to the bolster, allowing the distal sides of the fender to be retained between the two retaining arms of the bracket and the body of the bolster.

As a result, each end of the fender can be removed and attached through a single retaining means therefore considerably expediting the process of removing or installing the fender.

In one aspect the invention is a fender-mounting assembly for a trailer group. The assembly comprises a bolster having a side wall. A bracket is secured to the side wall, the bracket comprising an inboard upwardly extending retaining arm, and an outboard upwardly extending arm. Each of the retaining arms defines a gap between the arms and the side wall and a single retaining means is located medially on the side wall between the inboard and outboard retaining arms for retaining a portion of a fender to the side wall. In a more particular aspect, the fender has a forward end with opposed sides slidably disposed in the gaps, a medial portion of the fender being releasably retained to the side wall by the retaining means. In a yet more particular aspect, the fender is flexible in its medial portion and the retaining means comprises a post on the fender or on the bolster and an aperture on the opposed component adapted to engage over the post.

In another aspect the invention is a method of installing a fender on a bolster of a trailer group, the bolster having a side wall. The method comprises:

providing a bracket secured to the side wall and having opposed upwardly extending retaining arms respectively defining an inboard and an outboard gaps between the arms and the side wall;

inserting opposed sides of an end of a fender into the gaps; and, retaining the fender on the side wall by engaging a single retaining means associated with the bolsters and located medially between the retaining arms.

In a more particular aspect of the method, the step of engaging a single retaining means comprises bending a medial portion of the fender so as to engage an aperture over a post.

The foregoing may cover only some of the aspects of the invention. Other aspects of the invention may be appreciated by reference to the following description of at least one preferred mode for carrying out the invention in terms of one or more examples. The following mode(s) for carrying out the invention is not a definition of the invention itself, but is only an example that embodies the inventive features of the invention.

BRIEF DESCRIPTION OF THE DRAWINGS

At least one mode for carrying out the invention in terms of one or more examples will be described by reference to the drawings thereof in which:

FIG. 1 is a perspective view of a trailer group having bolsters and fenders attached between the bolsters according to the invention.

FIG. 2 is a side elevation of the system of FIG. 1.

FIG. 3 is perspective detail of the view of FIG. 1 providing detail of the bracket of the invention secured to the bolster, with the fender removed;

FIG. 5 is a perspective detail of the view of FIG. 1 providing detail of the bracket of the invention and the installed fender;

FIG. 6 is a perspective view of the bracket used in the invention;

Figure 4:
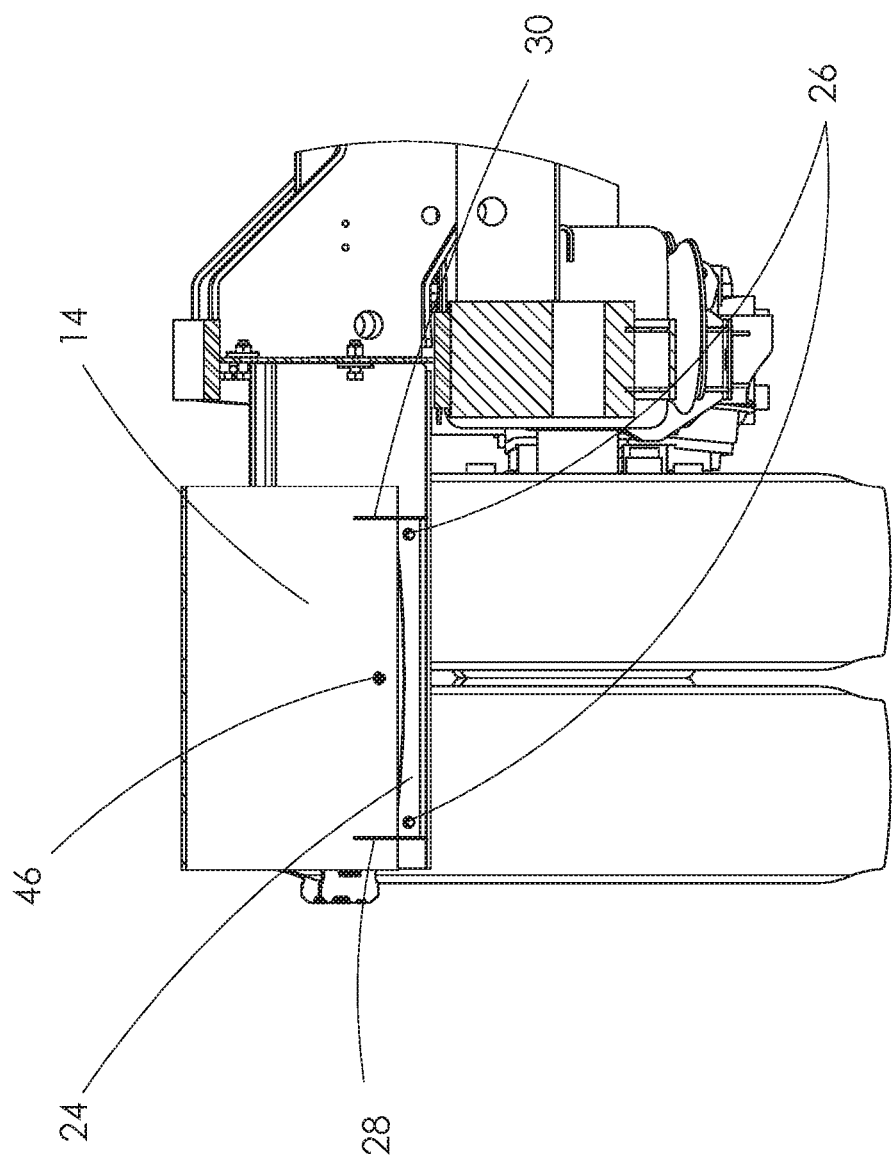
FIG. 4 is a front elevation of the bolster, the bracket and a fender taken along lines 4-4 of FIG. 2.

DETAILED DESCRIPTION OF AT LEAST ONE MODE FOR CARRYING OUT THE INVENTION IN TERMS OF EXAMPLE(S)

FIGS. 1 and 2 show a trailer group 10 having bolsters 12 and fenders 14 mounted between the bolsters 12 according to the preferred embodiment of the invention.

The bolsters 12 comprise a top substantially flat load-supporting surface 16 and opposed inwardly and downwardly inclined side walls 18. In the case of the rearmost bolster 20, there may be only one side wall 22 on the wheel side of the bolster. Side walls 18, 22 may be a differing angles depending the particular unit involved.

In a typical prior art arrangement (not shown), the forward end of each fender 14 is attached by two spaced bolts to the adjacent bolster side wall, while the rear of each fender is attached by two other spaced bolts to the side wall of the opposed bolster. The removal of the fender involves removing four bolts and supporting the fender as the last bolts are removed.

According to the invention, and as is also shown in FIGS. 3, 4 and 5, a bracket 24 (shown in isolation in FIG. 6) is secured to the side wall 18 of the bolster, for example by means of two bolts 26. Bracket 24 comprises opposed upwardly extending retaining arms 28, 30 defining gaps or slots 32, 34 between the retaining arms and the side wall 22 of the bolster 12. Inboard retaining arm 30 defines gap 32 while outboard retaining arm 28 defines gap 34. The gaps 32, 34 are sufficient to accommodate the thickness of the fender 14. The retaining arms 28, 30 are sufficiently short as to not extend beyond the top, load-supporting surface 16 of the bolster.

The fenders 14 comprise a substantially rectangular sheet of usually flexible material, bent to a curved shape. In the preferred embodiment each of the forward 40 and rearward 42 ends of the fender 14 is provided with a medial aperture 44 for receiving a bolt 46 or other equivalent means to retain the end of the fender to the bolster 12. Other equivalent means (illustrated in FIG. 9) may comprise a fixed post 46 on the bolster over which an aperture (44) on the fender is engaged, or vice versa, or other means.

The opposed sides 48, 50 of the ends of the fender are slidably disposed into the gaps/slots 32, 34 formed by the bracket retaining arms 28, 30. As a result, the sides of the fender are retained against bending and flapping while the body of the fender is retained on the bolster by the single bolt 46 or other retaining means such as a post.

The process of removing each fender therefore involves the removal of the medial part of the fender from the bolster by disengaging one retaining means at each end of the fender rather than unfastening four bolts as in the prior art. In the case of a flexible fender material as in the preferred embodiment, where a post and aperture retaining means are used for the medial portion of the fender, the medial portion can be disengaged by simply bending the medial portion away from the retaining means, so as to clear the retaining means, then sliding the balance of the fender out of the gaps formed by the retaining arms.

In addition, the retaining arms provide a means of supporting the fender even when the two bolts have been removed, facilitating the handling of the fender. Once the bolts are removed, the fender is simply lifted out of the retaining arm gaps/slots. Similarly, the installation process involves manually positioning the fender ends in the retaining slots on the opposed bolsters (with the fender held in position by the retaining arms without further handling) then securing the central bolt 46 or other retaining means at each end of the fender. Again, in the case of a post and aperture retaining means the installation can be done simply by bending the medial portion of the fender to engage the retaining means as the fender is slipped between the gaps formed by the retaining arms.

Figure 7:
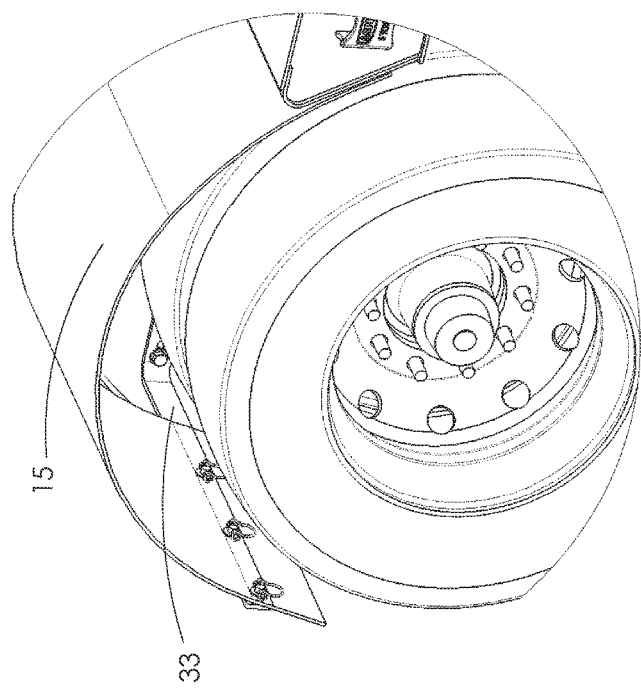
FIG. 7 is a perspective detail of the view of FIG. 1 providing detail of the attachment of the forwardmost end of the forwardmost fender.
Figure 8:
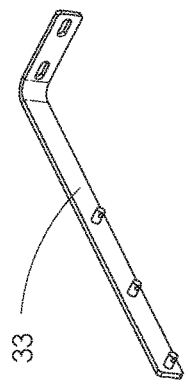
FIG. 8 is a perspective view of the end bracket for the forwardmost fender; and, FIG. 9 is a view of a fender having a hole that engages over a post formed in the bolster.

According to the illustrated embodiment and shown in FIGS. 7 and 8, a different arrangement is used for the forwardmost fender 15 for which there is no bolster at the forward end of the fender. A suitable bracket such as end bracket 33 may be used to attach the forward end of the fender 15.

According to the preferred embodiment, the single retaining means retaining the fender 14 to the side wall 18 of the bolster 12 comprises a bolt 46 engaging an aperture 44 in the fender. It will be appreciated that the fastening means may vary. For example, the side wall may have a post extending therefrom to engage aperture 44 in the fender. Other arrangements are possible. Provided that the fastening means is reasonably releasable to facilitate installation and removal of the fender by an operator, and that a single fastening means is located medially between the inboard and outboard retaining arms on either the side wall or the fender, the fastening means will be within the intended scope of the invention.

In the foregoing description, exemplary modes for carrying out the invention in terms of examples have been described. However, the scope of the claims should not be limited by those examples, but should be given the broadest interpretation consistent with the description as a whole. The specification and drawings are, accordingly, to be regarded in an illustrative rather than a restrictive sense.

The invention claimed is:

1. A fender-mounting assembly mounted on a trailer group having a plurality of wheels comprising:
   a bolster for supporting loads, said bolster being located between successive wheels of said plurality of wheels, said bolster having a side wall;
   a bracket secured to said side wall, said bracket comprising an inboard upwardly extending retaining arm, and an outboard upwardly extending arm, each of said retaining arms defining a gap between said arms and said side wall; and,
   a single retaining means located medially on said side wall between said inboard and outboard retaining arms for retaining a portion of a fender to said side wall.

2. The assembly of claim 1, further comprising:
   said fender having a forward end, said forward end having opposed sides slidably disposed in said gaps, a medial portion of said fender being releasably retained to said side wall by said retaining means.

3. The assembly of claim 2 wherein said fender is flexible in said medial portion and wherein said retaining means comprises a post on said fender or on said bolster and an aperture adapted to engage over said post.

4. A method of installing a fender on a bolster of a trailer group, said bolster having a side wall, comprising:
   providing a bracket secured to said side wall of said bolster, said bracket comprising opposed upwardly extending retaining arms, a first one of said retaining arms defining an inboard gap between said first retaining arm and said wall and a second one of said retaining arms defining an outboard gap between said second retaining arm and said side wall;
   inserting opposed sides of an end of a fender into said inboard and outboard gaps;
   retaining said fender on said side wall by engaging a single retaining means associated with said bolster and located medially between said retaining arms.

5. The method of claim 4 wherein said step of engaging a single retaining means comprises bending a medial portion of said fender so as to engage an aperture over a post.

\* \* \* \* \*